United States Patent
Jacob et al.

(10) Patent No.: US 6,574,004 B1
(45) Date of Patent: Jun. 3, 2003

(54) SYSTEM AND METHOD FOR CONVERTING COLOR DATA TO GRAY DATA

(75) Inventors: Steve A. Jacob, Boise, ID (US); Kurt R. Bengtson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/354,639

(22) Filed: Jul. 16, 1999

(51) Int. Cl.[7] .............................................. G06K 15/00
(52) U.S. Cl. ..................... 358/1.13; 358/3.02
(58) Field of Search ........................ 358/1.1, 1.2, 1.6, 358/1.9, 2.1, 3, 3.01, 3.02, 3.04, 3.21, 3.23, 1.13, 534; 382/276, 293, 298, 297

(56) References Cited

U.S. PATENT DOCUMENTS 5,301,037 A * 4/1994 Kang et al. .................. 358/451
5,455,681 A * 10/1995 Ng .............................. 358/3.01

* cited by examiner

*Primary Examiner*—Arthur G. Evans

(57) ABSTRACT

A system and method converts color data to gray data by allowing target values to be set for the color components and combinations of the color components to provide high quality gray data output.

25 Claims, 3 Drawing Sheets

SYSTEM AND METHOD FOR CONVERTING COLOR DATA TO GRAY DATA

TECHNICAL FIELD

The present invention relates to the field of monochromatic output devices such as printers and video monitors. More particularly, the invention relates to converting color data to gray data for output on such devices.

BACKGROUND

Conventional monochromatic output devices such as laser printers, inkjet printers, video monitors, etc. employ several standard methods to convert color data to gray data. Color data is typically represented by quantitative values of three color components, either RGB (Red, Green, Blue) or CYM (Cyan, Yellow, Magenta). The quantitative values of the color components range from a minimum quantitative value of 0.00 for a color component not present in the color data to a maximum quantitative value of 1.00 for a color component present in the color data at its highest intensity. The conversion methods transform the quantitative values into a shade of gray represented by a value between 0.00 and 1.00 known as the "Y value" (also referred to as the "luminance") of the represented data.

For example, one method well known in the art is the NTSC conversion method. The user specifies the shade of gray desired for each color component when that color component is at its maximum quantitative value and the other color components are absent from the color data. This user-specified shade of gray is referred to as a "target value." In other words, the user first specifies a target value for the situation in which the quantitative value of the R component is 1.00 and the quantitative values for the G and B components are 0.00. Likewise, the user specifies a target value for the situation in which the quantitative value of the "G" component is 1.00 and the quantitative values for the R and B components are 0.00. Finally, the user specifies a target value for the situation in which the quantitative value of the B component is 1.00 and the quantitative values for the R component and the G component are 0.00. The NTSC conversion is then applied and a Y value indicating a shade of gray is derived for each combination of color components as the color data is processed.

A major drawback of the NTSC conversion is that the user is only allowed to specify the RGB components. As a result, the conversion does not result in high quality gray data output.

To overcome this drawback, one method utilizes an interpolated table lookup that allows the user to specify a gray target value for all nodes of a three dimensional memory array. That is, the user specifies target Y values for not only the RGB components, but also the combinations of all values of RGB.

The lookup table is stored in memory and contains a target value for particular combinations of color component quantitative values. When a combination of color component quantitative values is input that is not listed in the table, an interpolation routine utilizes the target values in the table to derive the proper Y value for the color data input. Such a method has been disclosed in U.S. patent application Ser. No. 09/181,063 filed on Oct. 27, 1998, entitled "Method of Determining Gray Values." It is noted that the assignee of this patent application is Hewlett-Packard Company, the assignee of the present application.

The interpolated table lookup method provides high quality gray definition of color data because of having more user-defined target values to reference and because the user is able to specify target values for many combinations of RGB values. However, this method requires high computational overhead because it requires significant memory as well as extended processor allocation. In today's competitive environment of low-cost computers, printers and electronic instruments, there is a need for a method to convert color data to gray data wherein the user may specify target values for the higher order color components to obtain high quality output while maintaining computational efficiency

SUMMARY

The present invention concerns a system and method for converting color data to gray data by allowing the user to define target values for all color components and combinations thereof, but without high computational overhead.

In the described implementation, the user specifies target values for the color component terms R, G, B, C, M, Y and W. Each target value specifies a is shade of gray to be associated with each color component term. These target values are stored in a target value table in memory. A coefficient is associated with each color component term and a conversion transformation is determined using the color component terms and the associated coefficients.

Gray scale boundary conditions based on the conversion transformation are generated wherein each boundary condition is represented as an equation that is the sum of products of the maximum quantitative value of each color component represented in the color data and the coefficient associated with those color component terms. The resulting set of equations are solved to determine the numerical values of each coefficient.

The quantitative values of all color components present in the color data are then received and multiplied by their respective coefficients in the conversion transformation to derive a Y value specifying a shade of gray.

After a Y value has been determined, a data correction process is applied to the Y value so that the gray data more closely exhibits desirable neutral axis behavior within a three-dimensional color space defined by the RGB components. This allows the neutral axis behavior to be modified independently of the gray target values selected for the saturated colors, RGB.

Color data is repeatedly received and converted into gray data utilizing the conversion transformation and the correction process. This results in improved output quality of the gray data while maintaining a low computational overhead environment.

DETAILED DESCRIPTION

The present invention concerns a system and method for converting color data to gray data. The invention may be implemented in a number of output devices that are either monochromatic or that have the ability to display monochromatic, or gray, data. Output devices that may utilize the present invention include laser printers, inkjet printers, computer monitors, photocopiers, scanners, electronic equipment having display screens and the like. For discussion purposes, the present invention is described in the context of a computer system having a laser printer.

Figure 1:
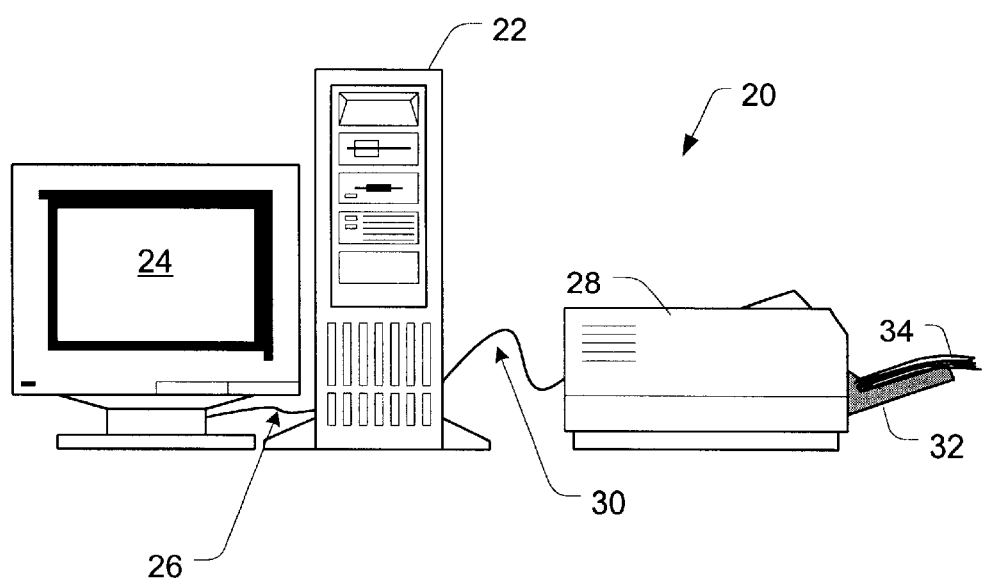
FIG. 1 is a diagrammatic illustration of a computer system with a monochromatic display and printer.

FIG. 1 shows a computer system 20 in which the present invention may be implemented. The system has a processing unit 22, a video display monitor 24, a monitor cable 26 connecting the monitor 24 to the processing unit 22, and a laser printer 28 connected to the processing unit 22 by a printer cable 30. The laser printer 28 has an paper output tray 32 which holds pages 34 output by the laser printer 28. For purposes of discussion, the laser printer 28 is a monochromatic, or gray scale, printer, although it may be a color printer printing gray only.

Figure 2:
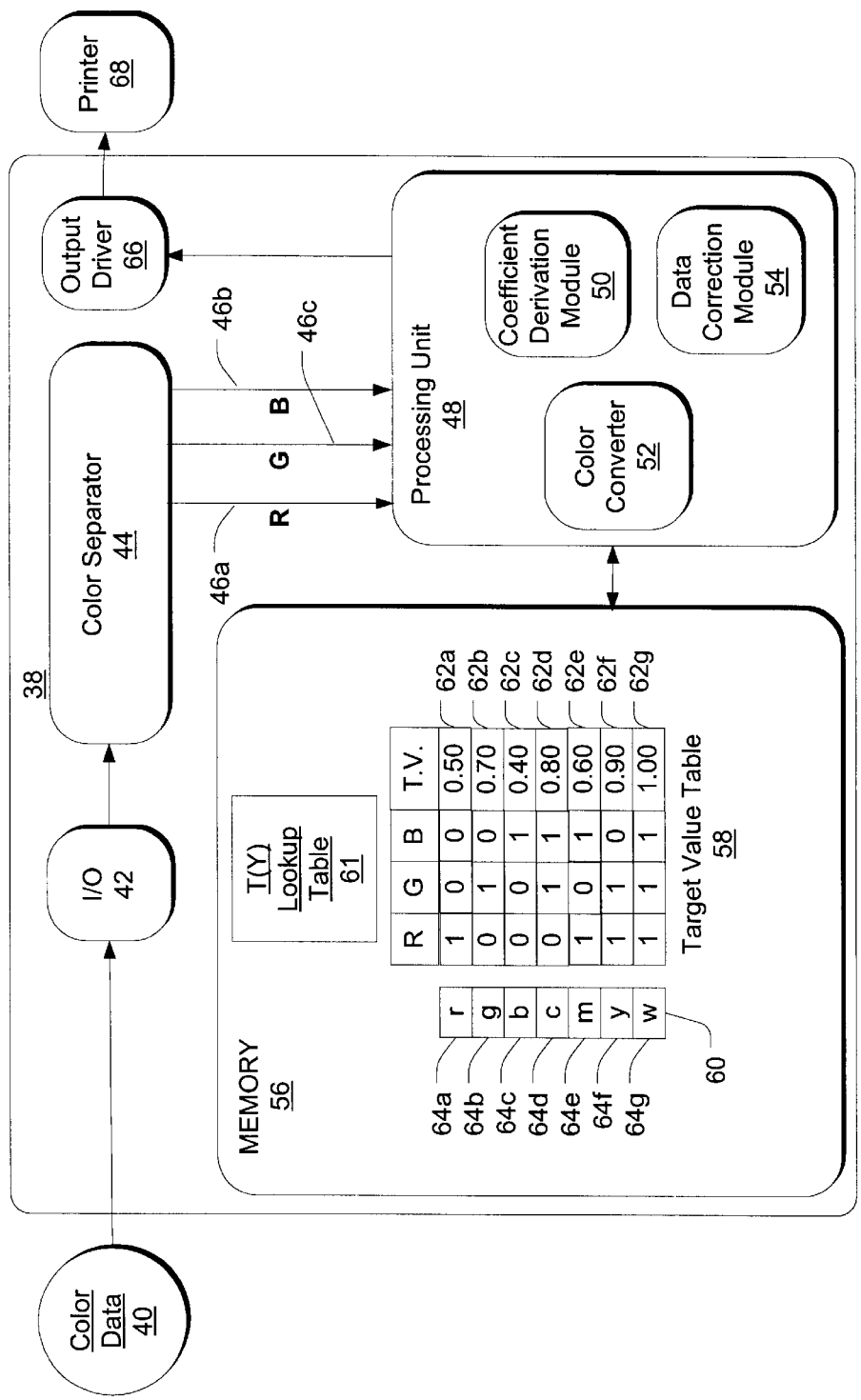
FIG. 2 is a block diagram of a color-to-gray conversion system implemented by the computer system of FIG. 1.

FIG. 2 is a block diagram of a color-to-gray conversion system 38 implemented in the computer system 20. The color-to-gray conversion system 38 may be implemented in the host computer system 20, it may be resident within the firmware of a device such as a printer or it may reside within the hardware of an electronic device. It is also noted that the computer system 20 may be resident within electronic storage of a computing device or be available as application software to a computing device.

Color data 40 is received into an input/output port 42 within the system 38. The color data 40 may be sent by any device designed to output color data, such as a scanner, photocopier, video card, electronic storage device, etc. The color data 40 may be in the form of raw color data or it may be in the form of quantitative values for the components of the color data 40. As depicted in FIG. 2, the color data 40 is input as raw color data.

The system 38 further has a color separator 44 that separates the color components RGB from in the color data 40 and determines the associated quantitative values 46a, 46b, 46c.

The color RGB color components have higher order components that are combinations of the RGB components. The higher order components are Cyan (C) which is the combination of Green (G) and Blue (B); Magenta (M) which is the combination of Red (R) and Blue (B); Yellow (Y) which is the combination of Red (R) and Green (G); and White (W) which is the combination of Red (R), Blue (B) and Green (G). It is noted that while the higher order color component that is the combination of all RGB color components may be utilized to render the color Black ("K") in some systems, for purposes of this disclosure, the combination of all RGB components refers to the color White (W).

Although the invention described is an RGB color system, it is noted that the invention could also utilize a CMY color system. In that case, the RGB components would be derived from the CMY components as follows:

R=(1−C); G=(1−M); and B=(1−Y).

The quantitative values of the RBG components 46a, 46b, 46c are input to a processing unit 48. The processing unit 48 has a coefficient derivation module 50, a color converter 52 and a data correction module 54.

The system 38 has a memory 56 (volatile and non-volatile) that is accessible by the processing unit 48. The memory stores a target value table 38, a table of coefficients 60, and a T(Y) lookup table 61. The target value table 58 holds the user-specified target values 62a–62g associated with each color component and each combination of color components wherein the maximum quantitative value is utilized for each color component present in the color data and the minimum quantitative value is utilized for each color component absent from the color data. The coefficient table holds the values that are derived by solving the set of boundary condition equations for a particular set of target values 62a–62g. The T(Y) lookup table 61 contains predefined values which will be used in the data correction process. The function of these components will become clear as they are explained in further detail below.

The system 38 further contains an output driver 62 that outputs the gray data converted from the color data 40 to the laser printer 28. Although the present invention describes the output device as being a laser printer 28, the output device can be any device designed to display monochromatic data such as a video display monitor 24, an inkjet printer (not shown), a photocopier (not shown), or the like.

Figure 3:
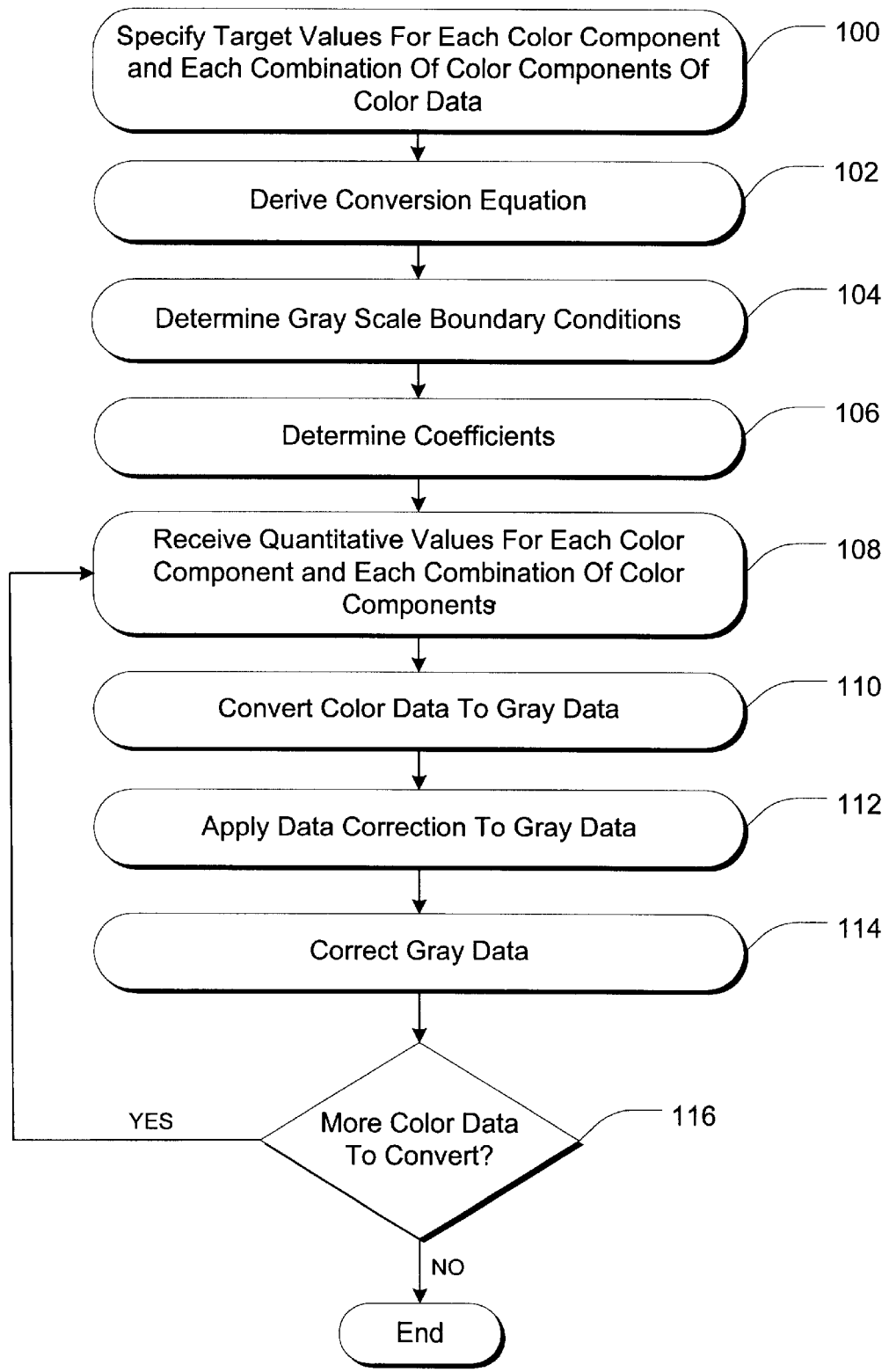
FIG. 3 is a flow diagram showing a color-to-gray conversion method.

FIG. 3 depicts a general process for converting color data to gray data according to the present invention. A target value 62 is specified for each RGB color component and each combination of components, CMYW, of the color data 40 (Step 100 of FIG. 3). The combinations of color components are C, the combination of G and B; M, the combination of R and B; Y, the combination of R and G; and W, the combination of R, G and B.

Setting a target value 62 is accomplished by first setting each individual color component to its maximum quantitative value while simultaneously setting the other color components to their minimum quantitative values. The target values 62 are defined by the user and are represented by decimal numbers which indicate a shade of gray corresponding to each of the color components and the combinations of the color components. The target values 62 range from a minimum target value of 0.00 to a maximum target value of 1.00. As an example of what the target values 62 represent, a target value 62a for red of 0.50 indicates that when the color red is input, the output will be a shade of gray that is fifty percent of the maximum shade of gray. For discussion purposes, the minimum target value of 0.00 refers to the color black and the maximum target value of 1.00 refers to the color white. However, those skilled in the art will appreciate that the present invention may be implemented utilizing the minimum target value of 0.00 as representing white and the maximum target value of 1.00 as representing black.

As shown in FIG. 2, a target value 62a of 0.50 has been specified for the situation in which the color component Red (R) has a maximum quantitative value and the other color components, Green (G) an Blue (B) have a minimum quantitative value, indicating their absence from the color data 40. Similarly, a target value 62b of 0.70 has been specified for the case in which the color component Green (G) has a maximum quantitative value and the other color components, Red (R) and Blue (B) have minimum quantitative values.

Likewise, a target value 62c of 0.40 has been specified for the situation in which the color component Blue (B) has a maximum quantitative value and the other color components, Red (R) and Green (G) have minimum quantitative values. These target values 62 are arbitrary and may be set to any shade of gray desired by the user.

In addition to setting target values 62 for the color components RGB, the present invention also allows the user to set target values for combinations of the color components. Again referring to FIG. 2 as an example, a target value 62d of 0.80 is specified for the situation in which the color components G and B have maximum quantitative values and the color component R has a minimum quantitative value. This combination of G and B results in the color Cyan (C) and this particular target value 62d represents the shade of gray desired to indicate the color Cyan.

Similarly, a target value 62e of 0.60 is specified for the case in which the color components R and B have maximum quantitative values and the color component G has a minimum quantitative value. This target value combination of R and B results in the color Magenta (M) and this particular target value 62e represents the shade of gray desired to indicate the color Magenta.

Likewise, a target value 62f of 0.90 is specified for the situation in which the color components R and G have maximum quantitative values and the color component B has a minimum quantitative value. This combination of R and G results in the color Yellow (Y) and this particular target value 62f represents the shade of gray desired to indicate the color Yellow.

Finally, a target value 62g of 1.00 has been set for the case in which all of the color components have a maximum quantitative value. As previously discussed, this combination results in the color White (W) and the target value of 1.00 indicates the absence of gray in the output.

The target values 62a–62g are persistently kept in the target value table 58 stored in the memory 56.

Next, at step 102 in FIG. 3, a conversion equation is derived and used by the color converter 52 to convert the quantitative values of the color components contained in the color data 20 into gray data for output on the output driver 66. The conversion equation utilizes coefficients 64a–64g which are stored in memory 56 in a table of coefficients 60. The coefficients may be pre-computed and specified by the user or, as shown herein, the coefficients may be computed by the system. For discussion purposes, the coefficients are indicated as r, g, b, c, m, y and w, which are associated, respectively, with the color components RGB and the combinations of color components, CMYW.

Each coefficient 64a–64g is multiplied by its associated color component or combination of color component. The resulting products are then summed to determine the Y value which represents a shade of gray associated with the color data 40. This process is represented by the following equation:

$$rR+gG+bB+cGB+mRB+yRG+wRGB=Y$$

The coefficients 64a–64g will be different for each set of target values 62 defined by the user. Using the target values 62 stored in the target value table 58, a set of gray scale boundary condition equations are determined and solved to derive the values of the coefficients which are then stored in the table of coefficients 60 (Steps 104 and 106 of FIG. 3). The boundary condition equations sum the coefficients to equal the specified target value for each color component and each combination of color components. If a color component is not present in the color data, its coefficient is zero and is not factored into the boundary condition equation for the color component or combination of color components. This results in the following set of boundary condition equations:

| R | G | B | Boundary Condition Equations | Target Values |
|---|---|---|---|---|
| 1 | 0 | 0 | r + 0 + 0 + 0 + 0 + 0 + 0 = | 0.50 (r) |
| 0 | 1 | 0 | 0 + g + 0 + 0 + 0 + 0 + 0 = | 0.70 (g) |
| 0 | 0 | 1 | 0 + 0 + b + 0 + 0 + 0 + 0 = | 0.40 (b) |
| 0 | 1 | 1 | 0 + g + b + c + 0 + 0 + 0 = | 0.80 (c) |
| 1 | 0 | 1 | r + 0 + b + 0 + m + 0 + 0 = | 0.60 (m) |
| 1 | 1 | 0 | r + g + 0 + 0 + 0 + y + 0 = | 0.90 (y) |
| 1 | 1 | 1 | r + g + b + c + m + y + w = | 1.00 (w) |

From these boundary condition equations, the following matrix system is produced:

$$\begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 1 & 1 & 1 & 0 & 0 & 0 \\ 1 & 0 & 1 & 0 & 1 & 0 & 0 \\ 1 & 1 & 0 & 0 & 0 & 1 & 0 \\ 1 & 1 & 1 & 1 & 1 & 1 & 1 \end{bmatrix} * \begin{bmatrix} r \\ g \\ b \\ c \\ m \\ y \\ w \end{bmatrix} = \begin{bmatrix} 0.50 \\ 0.70 \\ 0.40 \\ 0.80 \\ 0.60 \\ 0.90 \\ 1.00 \end{bmatrix}$$

Solving the matrix system produces values for each coefficient 64a–64g. For the target values specified herein, the values of the coefficients result to be as follows: r=0.5; b=0.7; g=0.4; c=−0.3; m=−0.3; y=−0.3; w=0.3.

Once the coefficients 64a–64g have been derived, the processing unit 48 receives the quantitative values for each color component and for each combination of color components of the color data (Step 108 of FIG. 3). The quantitative values and their associated coefficients 64a–64g are substituted into the conversion equation and a Y value indicating a shade of gray is derived which corresponds to the color data 40 (Step 110 of FIG. 3).

It is desirable to correct the derived Y value neutral axis behavior to obtain a higher quality output. The neutral axis is a diagonal within a three-dimensional color space having axes defined by the color components. The diagonal extends from the point where each of the RGB components is 0.0 (the Black point) to a point where each of the RGB components is 1.0 (the White point). The points along the neutral axis are color data points wherein each of the RGB components is equal. While the gray values assigned to the neutral axis may be linear, sometimes it is desirable to define a non-linear set of gray values, also called a tone reproduction curve. The tone reproduction curve can be linear or vary in shape to adjust contrast in various regions, i.e., shadows, highlights or midtones of the neutral axis.

The correction has the desired effect of decoupling the neutral axis tone reproduction curve from the tone reproduction curves associated with transitions from black to white through saturated colors, such as Red. This allows neutral axis contrast adjustments to be made independently of the contrast in chromatic regions of the input color space.

To correct the gray data to more closely exhibit the desired neutral axis behavior, the data correction module 54 applies a correction to the gray data derived by the color converter 52. If the gray data point does not lie on the neutral axis, the data correction module 54 computes a distance (d) from the neutral axis using the quantitative values of the color components. This is accomplished using the equation:

$$d=(\max (RGB)-\min (RGB))/\max(RGB)$$

wherein max(RGB) is the greatest quantitative value of the RGB color components and min(RGB) is the lowest quantitative value of the RGB color components.

The final correction is determined by applying the data to the equation:

$$Y \text{ (corrected)}=d^n*Y+(1-d^n)*T(Y)$$

where T(Y) is the target value looked up from either a one dimensional lookup table or a function such a min(RGB), and where n=1, 2, 3, . . . , k, or n=½, ⅓, ¼, . . . , 1/k, depending on whether a linear or non-linear correction is desired. The described embodiment utilizes n=1.

Although the present invention utilizes the function of the minimum quantitative values of RGB as the T(Y) values, those familiar with the art will understand that other values of the RGB components may be utilized as well for the T(Y) values.

Y (corrected) represents the final gray output value. This final gray output value is then output to the printer 68 (Step 114 of FIG. 3).

If there is more color data to convert to gray data, the process is repeated from step 108 of FIG. 3. If there is no more color data to convert to gray data, the process is terminated (Step 116 of FIG. 3).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for converting color data to gray data, the color data having one or more color components where each color component has a quantitative value ranging from a minimum quantitative value to a maximum quantitative value, the method comprising:

specifying a target value for each color component and each combination of color components of the color data, the target value setting a shade of gray which corresponds to the maximum quantitative value for a corresponding color component or combination thereof;

deriving a conversion equation to convert the color data into a shade of gray associated with the color data, the conversion equation equaling the sum of the products obtained by multiplying the quantitative value of each color component and each combination of color components with an associated coefficient;

determining a gray scale boundary condition equation for each of the color components and the combinations of color components by substituting the maximum quantitative values into the conversion equation for any color component present in the color data and the minimum quantitative values for any color component not present in the color data;

determining the coefficients for each color component and for each combination thereof using the gray scale boundary condition equations and the target values;

receiving the color data; and converting the color data to gray data by solving the conversion equation using the quantitative values for each color component and for each combination of color components and their associated coefficients.

2. The method recited in claim 1 further comprising separating the color data into its color components after receiving the color data and assigning a quantitative value to each color component.

3. The method recited in claim 1 further wherein receiving the color data comprises receiving the quantitative values for each color component of the color data.

4. The method recited in claim 1 wherein the color data is repeatedly received and converted to gray data for all color data after the coefficients for each color component and for each combination of color components are derived.

5. The method recited in claim 1 further comprising correcting the gray data output from the color converter so that the gray data more closely conforms to neutral axis behavior within a color space defined by the color components.

6. The method recited in claim 5 wherein the correcting the gray data comprises:

defining a three-dimensional color space using the color components as coordinates;

defining the neutral axis as being a diagonal axis within the three-dimensional color space wherein each color component has an equal quantitative value;

determining the distance from the neutral axis to a color data point wherein the quantitative values of each color component are not equal; and determining a corrected gray data output utilizing the uncorrected gray data, the distance from the neutral axis, and the specified neutral axis target values or tone reproduction curve.

7. The method recited in claim 1 wherein the gray data is output to a printer or a video display monitor.

8. One or more computer-readable storage media containing a program for performing the method recited in claim 1.

9. A system comprising:

an input/output port to receive color data input having a minimum quantitative value and a maximum quantitative value for each color component of the color data;

memory to store a target value table containing user-specified target values which specify a shade of gray associated with the maximum quantitative value for each corresponding color component and each combination of color components;

a processing unit;

a color converter module executable on the processor to convert the color data into a shade of gray associated with the color data by summing the products obtained by multiplying the quantitative value of each color component and each combination of color components with a coefficient associated with each;

a table of coefficients stored in the memory to store the coefficients; and an output device to present the gray data.

10. The system recited in claim 9 further comprising a color separator for separating the color data into each of the color components of the color data and for assigning a quantitative value to each color component.

11. The system recited in claim 9 wherein the coefficients are derived by applying the color converter process using the maximum quantitative values for any color component present in the color data and the minimum quantitative value for any color component not present in the color data.

12. The system recited in claim 9 wherein the output device is a printer or a video display monitor.

13. The system recited in claim 9 wherein the coefficients are user-specified.

14. The system recited in claim 9 further comprising a coefficient derivation module executable on the processor to derive the coefficients.

15. The system recited in claim 9 further comprising a data correction module configured to correct the gray data output to more closely conform the data to desired neutral axis behavior within a three-dimensional color space defined by the color components.

16. A system comprising:

an input/output unit to receive color data input having a minimum quantitative value and a maximum quantitative value for each color component of the color data;

memory to store a target value table containing user-specified target values which specify a shade of gray associated with the maximum quantitative value for each corresponding color component and each combination of color components;

a processing unit;

a coefficient derivation module executable on the processor to derive a coefficient for each color components and each combination of color components;

a color converter module executable on the processor to convert the color data into a shade of gray associated with the color data;

a table of coefficients in stored in the memory to store the coefficients derived by the coefficient derivation module;

a data correction module configured to correct the gray data output from the color converter to more closely conform the data to desired neutral axis behavior within a three-dimensional color space defined by the color components; and an output device for displaying the gray data.

17. The system recited in claim 16 further comprising a color separator for separating the color data into each of the color components of the color data and for assigning a quantitative value to each color component.

18. The system recited in claim 16 wherein the coefficients are derived by applying the color converter process using the maximum quantitative values for any color component present in the color data and the minimum quantitative value for any color component not present in the color data.

19. The system recited in claim 16 wherein the color converter converts the color data into gray data by summing the products obtained by multiplying the quantitative value of each color component and each combination of color components with its associated coefficient.

20. The system recited in claim 16 wherein the data correction module corrects the gray data output by the color converter by:

defining a three-dimensional color space using the color components as coordinates;

defining the neutral axis as being a diagonal axis within the three-dimensional color space wherein each color component has an equal quantitative value;

determining the distance from the neutral axis to a color data point wherein the quantitative values of each color component are not equal; and determining a corrected gray data output utilizing the uncorrected gray data, the distance from the neutral axis, and the specified neutral axis target values.

21. The system recited in claim 16 wherein the output device is a printer or a video display monitor.

22. Computer-readable media having computer-executable instructions for:

receiving color data, the color data having one or more color components wherein each color component has a quantitative value ranging from a minimum quantitative value to a maximum quantitative value;

storing a user-specified target value for each color component of the color data and for each combination of said the components, the target values specifying a shade of gray which corresponds to the maximum quantitative value of each color component and each combination of color components;

converting the color data to gray data utilizing the quantitative values of the color components and a coefficient associated with each quantitative value; and repeatedly receiving additional color data and converting the color data to gray data utilizing the quantitative values of the color components and the coefficients.

23. The computer-readable medium recited in claim 22 wherein coefficients associated with each quantitative value are user-specified.

24. The computer-readable medium recited in claim 22 having additional computer executable instructions for simultaneously solving a set of gray scale boundary condition equations to derive the coefficients, there being one boundary condition equation for each color component and for each combination of color components, each boundary condition equation equaling a sum of the products of the maximum quantitative value for each color component or combination of components which is present in the color data and the coefficient associated with said each color component and said each combination thereof.

25. The computer-readable medium recited in claim 22 having additional computer-executable instructions for correcting the derived gray data to more closely exhibit desired neutral axis behavior.

* * * * *